June 9, 1925.
W. J. L. BAUER
1,541,678
COLLECTING ELECTRODE FOR ELECTRICAL GAS CLEANING APPARATUS
Filed Jan. 8, 1924
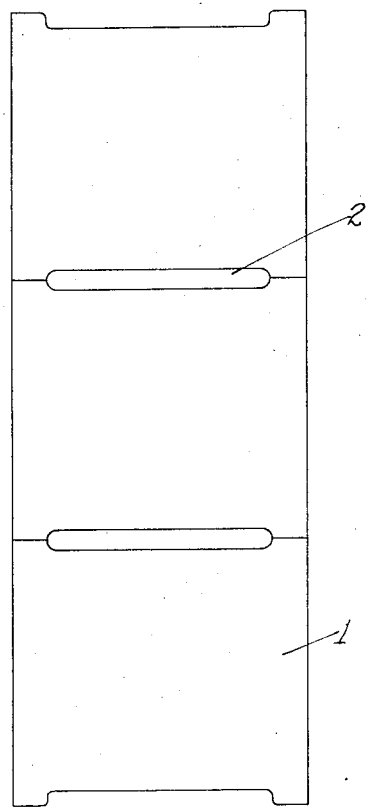
ELECTRODE MEMBER CONSISTING OF SEMI-
CONDUCTING NON-METALLIC MATERIAL AND CARBON
INVENTOR
Wilhelm Johannes Lorenz Bauer
BY
Arthur P. Knight
ATTORNEY Patented June 9, 1925.

1,541,678

UNITED STATES PATENT OFFICE.

WILHELM JOHANNES LORENZ BAUER, OF FRANKFORT-ON-THE-MAIN, GERMANY, ASSIGNOR TO INTERNATIONAL PRECIPITATION COMPANY, OF LOS ANGELES, CALIFORNIA, A CORPORATION OF CALIFORNIA.

COLLECTING ELECTRODE FOR ELECTRICAL GAS-CLEANING APPARATUS.

Application filed January 8, 1924. Serial No. 685,065.

*To all whom it may concern:*

Be it known that I, WILHELM JOHANNES LORENZ BAUER, citizen of the Republic of Germany, residing at Frankfort-on-the-Main, in the county of Hessen-Nassau and State of Prussia, have invented a new and useful Improvement in Collecting Electrodes for Electrical Gas-Cleaning Apparatus, of which the following is a specification.

The present invention relates to an improvement in collecting electrodes for electrical gas cleaning apparatus, and particularly to electrodes for this purpose which are formed of carbon bearing material. It has been found that such electrodes are especially resistant at high temperatures and for treatment of gases or material that are corrosive.

According to the present invention the collecting electrodes may be formed of material such as has been used for the production of the carbon electrodes for electrical furnaces. These carbon electrodes are formed in any suitable shape for example as plates and may be more or less carbonized according to the electrical resistance and the chemical resistance desired. One way in which the plates or electrodes may be formed is by molding a mixture of suitable carbonaceous binding material (for example tar or pitch) with a poorly conducting material (semi-conductor or non-conductor) such for example as "chamotte" (a mixture of fire clay with broken fire brick) the mixture being molded to desired shape and then burnt so as to harden the clay and carbonize or coke the carbonaceous material which acts as a binder. Any suitable clay material may be used in connection with the carbonaceous material to form the electrodes.

According to this invention the collecting electrodes may also be formed of two or more plates attached to or in contact with one another, said plates being, if desired, of different conductivity and composition, forming composite electrodes.

An embodiment of the invention is illustrated in the drawing, showing a collecting electrode constructed according to the invention.

As shown the collecting electrode consists of several individual plates 1, for example, of carbonized electrode bodies, such as are used for electric furnace electrodes. These individual plates are supported in any suitable manner so as to act as collecting electrode members, and are preferably in contact with one another only at parts of their edge portions and consequently there remain between the individual plates the open slots 2. This construction avoids in a practical manner the production of strains within the plates. The slots 2 also facilitate the to-and-fro movement of scraping devices in case same are used to clean the electrodes. The slots serve to guide such scraping devices by engagement with suitable parts of such devices.

What I claim is:

1. A collecting electrode for an electrical gas cleaning apparatus comprising an electrode member consisting throughout of a mixture of semi-conducting non-metallic material and carbon.

2. A collecting electrode member for electrical precipitators comprising a molded plate-shaped body consisting throughout of a mixture of semi-conducting non-metallic material and carbon.

3. A collecting electrode member for an electrical gas cleaning apparatus consisting wholly of a body of semi-conducting material mixed with carbon.

4. A collecting electrode member for an electrical gas cleaning apparatus consisting wholly of a body of burnt clay-containing material mixed with carbon.

5. A collecting electrode member for an electrical gas cleaning apparatus consisting wholly of a mixture of burnt clay-containing material and carbonized carbonaceous material.

6. A collecting electrode for an electrical gas cleaning apparatus consisting of a plurality of individual plates each consisting of semi-conducting material and said plates having their adjacent edges recessed to form slots.

In testimony whereof I have hereunto subscribed my name this 10th day of December, 1923.

WILHELM JOHANNES LORENZ BAUER.

Witnesses:
C. C. L. B. WYLES,
ERIKA JAEGER.